United States Patent
Woodridge et al.

[15] 3,641,982
[45] Feb. 15, 1972

[54] BIVALVIA DEPURATION SYSTEM

[72] Inventors: David D. Woodridge; Joseph Clyde Kitchel; William R. Garrett, all of Brevard County, Fla.

[73] Assignee: National Shellfish Processors, Inc., Brevard County, Fla.

[22] Filed: Apr. 7, 1969

[21] Appl. No.: 827,441

[52] U.S. Cl.........................................119/4, 99/158, 99/217
[51] Int. Cl. .....................................................A01k 61/00
[58] Field of Search....................99/157, 158, 214, 211, 217, 99/218, 221–224; 119/2, 3, 4, 5; 250/52

[56] References Cited

UNITED STATES PATENTS

| | | | |
|---|---|---|---|
| 1,945,102 | 1/1934 | Tranin et al. | 99/218 |
| 2,384,203 | 9/1945 | Sperti | 99/218 X |
| 2,482,507 | 9/1949 | Rentschler et al. | 99/218 |
| 3,116,712 | 1/1964 | Ogden et al. | 119/3 |
| 3,192,054 | 6/1965 | Kuhl et al | 99/214 |
| 3,300,990 | 1/1967 | Jaremus | 99/218 X |
| 3,418,138 | 12/1968 | Dennis et al. | 119/4 |
| 2,887,583 | 5/1959 | Emanuelson | 99/221 X |
| 3,305,683 | 2/1967 | Volonakis | 250/52 |
| 2,427,171 | 2/1969 | Jeppson | 99/221 |

Primary Examiner—Norman Yudkoff
Assistant Examiner—Curtis P. Ribando
Attorney—Duckworth and Hobby

[57] ABSTRACT

A bivalve depuration apparatus and method are provided in which bivalves, such as oysters, taken from contaminated waters, may be purified and rendered marketable.

4 Claims, 3 Drawing Figures

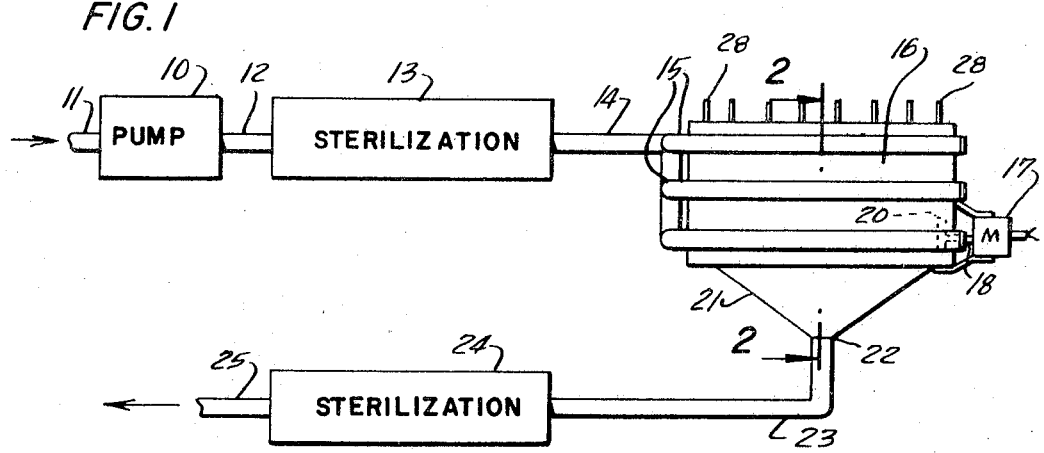
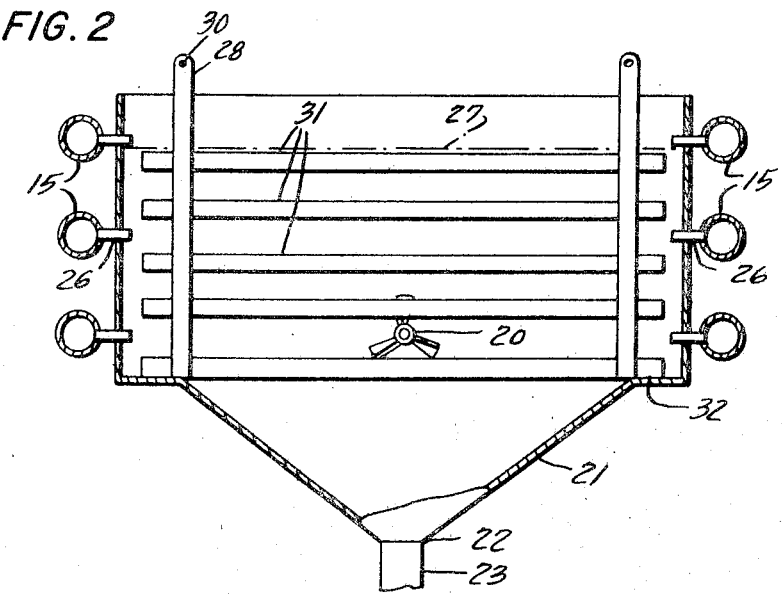
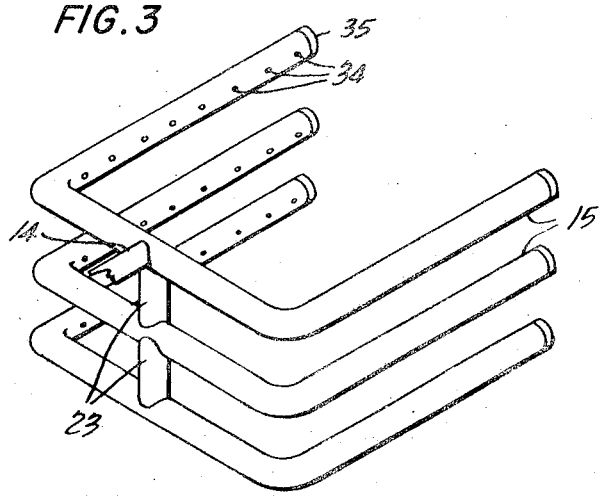
DAVID D. WOODBRIDGE
J. CLYDE KITCHEL
WILLIAM R. GARRETT
INVENTORS
BY Duckworth and Hobby
ATTORNEYS

BIVALVIA DEPURATION SYSTEM

BACKGROUND OF THE INVENTION

1. Field of the Invention

Bivalves, such as oysters, have hinged double shells or valves which are opened and closed by the oyster which pumps or passes water through its system at varying rates while absorbing oxygen from the water and trapping food, such as minute plankton, and the like. However, with the growth of population around coastal areas and the discharge of untreated domestic sewage, and industrial waste into natural waters, oysters are rendered unmarketable because of the accumulation in the oyster of undesirable microbiological agents, such as disease-causing bacteria and viruses. This has been especially true as relates to certain types of hepatitis which has been transmitted through consumption of bivalves. Suitability of locations for harvesting bivalves for human consumption has been greatly diminished in recent years which suitability is determined by bacteriological examination of the water near the harvesting area. That is, shellfish are not permitted to be taken from areas that contain predetermined bacteria counts or degrees of pollution. However, oysters from a polluted area will cleanse or depurate themselves when placed in cleaner waters, under the proper conditions. The rate of depuration varies with the type of bivalve and more specifically with the pumping rate of the particular bivalve. The pumping rate varies with different conditions of the medium but the water temperature is shown to be very important, with the temperature generally being ideal when the water is in the range between 70° and 80° F. Pumping generally slows down as the water temperature is lowered until it stops pumping altogether and the oyster is considered in hibernation, usually, as the temperature approaches 40° F.

It has also been observed that in the presence of harmful substances in the water, oysters may remain closed for long periods of time, which helps with the survival of oyster and an oyster may remain alive for a long period even when kept in air at a proper temperature. Many disturbances such as mechanical disturbances, change in illumination or the presence of irritating substances, are sensed by the oyster and the stimulus conveyed through the nerves results in closing of the shell. On the other hand, warming of the oyster, shaking and rough handling, frequently causes relaxation of the abductor and causes the valves to gap and if the oyster has been removed from the water, the water retained in the shell is lost and the oyster very quickly dies.

The present invention provides a more efficient system for the depuration of oysters from polluted waters.

2. Description of the Prior Art

In the past it has been suggested to treat bivalves, such as oysters, from moderately polluted areas. One such prior art system treats tainted bivalves by submerging the bivalve in a tank of continuously moving ultraviolet ray treated salt water, the depth of which varies from one-sixteenth inch to 12 inches for from 1 to 336 hours at water temperatures between 34° and 90° F. This system uses a shallow tank in which water is pumped out of one end through a second smaller tank placed directly under ultraviolet lamps and then into the other end of the first tank which holds the bivalves.

It has also been suggested in the past to wash the outsides of the shells and the like, by a chlorinated solution to disinfect the outside surfaces of the shells, and then to remove all traces of chlorine, prior to placing the oysters in sterile water for self purification. While these systems have proved satisfactory under certain conditions, and in particular under experimental or laboratory conditions, they have been less satisfactory on a large scale adapted for economic utilization of large harvesting areas located in polluted waters.

SUMMARY OF THE INVENTION

The present invention utilizes an open end system of continuously flowing water directly from the source which the bivalves have been removed and back into the initial water source. This open end or continuous flow system initially has a pump to pump the water from the water source through a radiation sterilizer, such as a gamma or nuclear radiation irradiator, or special industrial or commercial ultraviolet water purifiers, so that sterilized water is provided which is substantially similar to the waters from which the oysters have been removed. This water is fed into large tanks at several levels in the tank where oysters may be located on removable shelves. The tanks also have means other than the action produced by the entering water for producing movement of the water in the tank. The water leaves the tank from the bottom and passes through a second sterilizer essentially identical with the first sterilizer and back into the original water source. The second sterilizer has the advantage of returning substantially sterilized water back to the original source rather than allowing water recontaminated from the oysters to reenter the water source.

The present system may also be provided with means for movement of the trays of oysters such as by shaking, and for controlling the water temperature as desired, although this has not been found necessary in the warmer climates.

BRIEF DESCRIPTION OF THE DRAWINGS

Other objects, features and advantages of this invention will be apparent from a study of the written description and the drawings in which:

FIG. 1 shows a flow diagram of one embodiment of the present invention.

FIG. 2 shows a view taken along line 2—2 of FIG. 1 and illustrating one embodiment of the tank used in the present invention.

FIG. 3 shows the piping system for the input of water to the tank of the embodiment of FIGS. 1 and 2.

DESCRIPTION OF THE PREFERRED EMBODIMENT

Referring now specifically to FIG. 1, a flow diagram is shown in which the present invention may be seen to be an open end system in which water is pumped from the water source from which the oysters, or the like, have been taken, and enters a pump 10 from pipe 11. Pump 10 in turn pumps the water through a pipe 12 into a sterilizer 13 which purifies or sterilizes the water passing therethrough. Sterilizer 13 must be of a type that will sterilize the water without changing its content such as introducing any new substances therein which might result in the oysters refusing to depurate because of the noxious substances. For instances, it has been found that chlorine sterilizers leaving a residue of chlorine in the water result in the oysters refusing to depurate. Accordingly, a radiation sterilizer is preferred. One such sterilizer might be a gamma radiation irradiator for very large operations which would make such a sterilizer feasible. Such irradiators have been found very effective in purification of contaminated fluids. A second type of sterilizer that is contemplated, is an ultraviolet water purifier of a commercial or industrial type. These purifiers are commercially available for uses from amounts as small or smaller than 100 gallons per hour, to in excess of 1 million gallons per day, as required, and may be obtained complete with power supplies, safety monitoring controls and also including such things as alarms and multiple wiper assemblies for keeping quartz jackets clean. One such commonly available ultraviolet water purifier is manufactured by Ultradynamics Corp., 2 Wait Street, Paterson, N.J. which sells these sterilizers in a variety of sizes. A gamma radiation sterilizer may be seen in copending U.S. Pat. application No. 693,475 entitled "Radiation Treatment Method and Apparatus for Decontamination of Polluted Fluid," filed Dec. 14, 1967. Once the water is sterilized, it leaves sterilizer 13 in the same condition as entering except substantially sterilized. The water leaves sterilizer 13 in pipe 14 which enters into a three-layered pipe input system 15 wrapped in a U-shape around a tank 16. These tank input pipes 15 spray the sterilized water across the top of the water in the tank and at two layers beneath the water, which keeps the water moving rapidly within the tank. Tank 16 has additional means for providing movement of water in the tank illustrated by a motor 17 attached to tank 16 with a shaft 18 passing through the tank, and having a propeller 20 connected to shaft 18 inside of tank 16. The shaft, of course, has shift seals thereon to prevent water from leaving around the shift. Tank 16 has a funnel or pyramided shape bottom portion 21 and a drain 22 leading out of the tank from the center of portion 21 into pipe 23 and into a second sterilizer 24. Sterilizer 24 may be essentially similar to sterilizer 13, and sterilizes the water that has been recontaminated by depuration of the oysters prior to this water being fed back into the original water source by pipe 25. As can be seen, an open end depuration system provides for the continuous flow of water into and out of the system during the depuration of oysters, and the like.

Referring now to FIG. 2. A view of tank 16 taken along line 2—2 of FIG. 1 may be more clearly seen in which the top tier of pipes 15 sprays water through nozzles 26 across the top of the water located in tank 16 and the two lower tier pipes 15 pass water through the respective nozzles 26 into and below the water level of water 27 in tank 16. This entry of water in tanks is such as to provide for continuous movement of water in the tank. Propellor 20 can also be clearly seen from this view and is of course used to provide additional motion and flow control to the water 27 in tank 16. A frame 28 can be seen to have holes 30 located therein which holes are used in removing the frame from the tank. Frame 28 is provided with means for holding racks on trays 31 in such a manner that trays 31 may be removed from the frame 28 when removed from the tank 16. These trays 31 may be made of a framework having a ½-inch mesh stainless steel screen bottom and are for placing the oysters or bivalves thereon in a desirable manner spread out across the trays 31. Frame 28 is adapted to set on ledges or supports 32 located in the bottom portion of the tank just above the bottom portion 21. The water leaving tank 16 passes through drain 22 which is adapted to funnel fine pieces of trash, and the like, along with it to pipe 23.

FIG. 3 shows the pipes 15 in more detail, as well as entrance pipe 14. As can be seen, entrance pipe 14 enters the topmost pipe 15, which has interconnecting pipes 33 between the layers of pipe 15. Pipe 15 can also be seen to have a series of spray holes 34 which, as shown in the embodiment of FIGS. 1 and 2, may also have small nozzles connected thereto which are not shown in this view. Pipes 15 of this embodiment also have capped ends 35. It will of course be clear that other embodiments are anticipated for the entrance of water into the tanks may be provided without departing from the spirit and scope of the present invention.

The present invention is not to be construed as limited to the particular forms disclosed herein, since these are to be regarded as illustrative rather than restrictive.

We claim:

1. An open end bivalvia depuration system comprising in combination: a pump for continuously pumping water from a water source; a depuration tank for receiving water pumped from said water source and adapted for the depuration of bivalves therein; a first gamma irradiator means located between said water source and said depuration tank for irradiating the water being pumped from said water source; water return means for the egress of water from said depuration tank back into said water source; second gamma irradiator means for irradiating the water being returned from said depuration tank to said water source with a gamma radiation source; water current producing means in said depuration tank for producing water current in the water in said depuration tank to simulate the water current of the water source; said depuration tank receiving water at a plurality of levels and said tank having a removable frame therein, said frame having a plurality of trays thereon adapted for placement of bivalves for the depuration thereof, said trays being removable from said frame when said frame is removed from said depuration tank and said frame having means for agitating said frame with said trays thereon whereby depuration of said bivalves is encouraged.

2. The system according to claim 1 in which said depuration tank current producing means is a motor-driven impeller.

3. The system according to claim 2 in which said depuration tank receives said water into said tank on three levels.

4. The system according to claim 3, in which said depuration tank has an angled bottom adapted to direct materials into said water return means.

* * * * *